United States Patent [19]

Thompson

[11] Patent Number: 5,046,353
[45] Date of Patent: Sep. 10, 1991

[54] UNDERGROUND PIPE LEAK DETECTION SYSTEM

[75] Inventor: Glenn M. Thompson, Tuscon, Ariz.

[73] Assignee: Tracer Research Corporation, Tucson, Ariz.

[21] Appl. No.: 303,459

[22] Filed: Jan. 26, 1989

[51] Int. Cl.$^5$ ............................................. G01M 3/20
[52] U.S. Cl. ................................ 73/40.7; 73/40.5 R; 436/3
[58] Field of Search ............................ 73/40.7, 40.5 R; 422/83; 436/3, 56, 27–30, 161; 340/605

[56] References Cited

U.S. PATENT DOCUMENTS

| | | | |
|---|---|---|---|
| 312,541 | 2/1885 | Westinghouse, Jr. | 73/40.5 R |
| 634,687 | 10/1899 | Hartenfels | 73/40.5 R |
| 1,252,487 | 1/1918 | Payne | 73/40.5 R |
| 2,855,757 | 10/1958 | Meade | 73/40.5 R |
| 2,928,247 | 3/1960 | Hubbell | 73/40.7 |
| 3,085,423 | 4/1963 | Champion | 73/40.5 R |
| 3,402,596 | 9/1968 | Woodruff | 73/40.7 |
| 3,964,292 | 6/1976 | Jackson | 73/40.5 R |
| 3,995,472 | 12/1976 | Murray | 340/605 |
| 4,189,938 | 2/1980 | Heim | 73/40.7 |
| 4,648,260 | 3/1987 | Zuckerman | 73/40.7 X |
| 4,709,577 | 12/1987 | Thompson | 73/40.7 |
| 4,725,551 | 2/1988 | Tompson | 436/3 |
| 4,754,136 | 6/1988 | Thompson | 73/49.2 |

OTHER PUBLICATIONS

Niaki, S., et al. *Underground Tank Leak Detection Methods a State-of-the-Art Review*; 1986.

Primary Examiner—Hezron E. Williams
Attorney, Agent, or Firm—David G. Rosenbaum

[57] ABSTRACT

An apparatus and method for detecting leaks in underground fluid pipes. Detection of a leak is achieved by introducing a liquid phase tracer into the fluid within the underground pipe, which volatilzes to a gas phase when the fluid leaks from the underground fluid pipe. A permeable tube is buried in the soil in a position above an underground fluid transfer pipe. At least one end of the permeable tube is terminated in a recess vault for access to the end of the permeable tube and sampling soil gases from the permeable tube. Should any fluid leak occur in the underground fluid transfer pipe, the escaping tracer escapes in liquid form and, upon encountering free air in the subsurface soil, vaporizes to the gas phase and diffuses through the soil surrounding the underground fluid transfer pipe and into the permeable tube for collection and analysis.

33 Claims, 2 Drawing Sheets

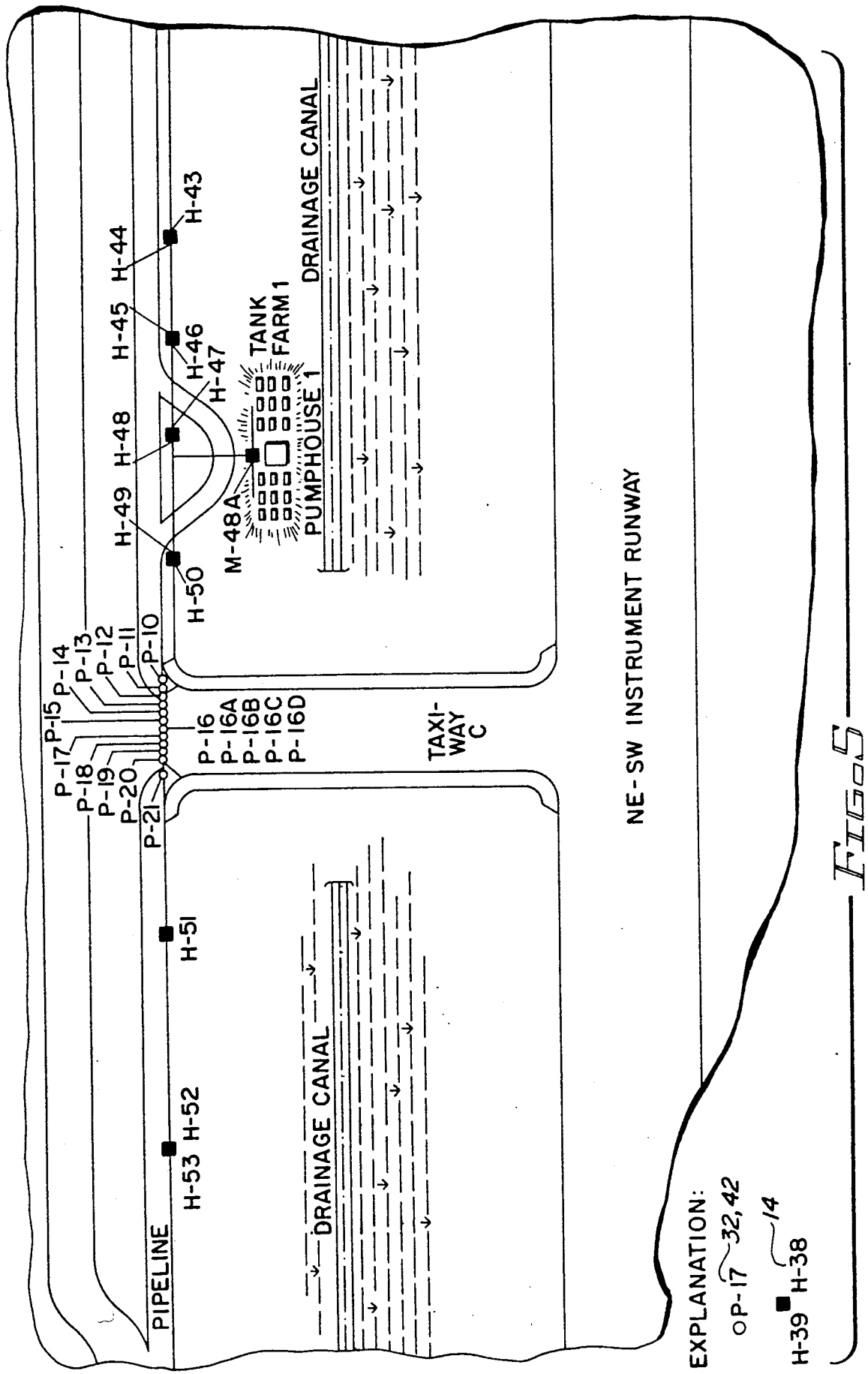

UNDERGROUND PIPE LEAK DETECTION SYSTEM

BACKGROUND OF THE INVENTION

This invention relates generally to a rapid leak detection apparatus and method for underground fluid pipe systems. More particularly, the present invention relates to an apparatus and method for the rapid detection and location of leaks from underground fluid transfer pipes.

To date there are no known testing procedures for accurately detecting and locating leaks in underground fluid transfer pipes. The present invention provides a tracer leak detection method which relies upon the addition of a highly volatile liquid chemical to the fuel. When a leak occurs in the underground fluid transfer pipes, the fluid contained within the pipes leaks into the surrounding soil. The tracer escapes from the fuel by vaporization and disperses into the surrounding soil by molecular diffusion.

Detection of leaks in fluid transfer pipes by standard means is labor intensive and insensitive. Typically, a leak is discovered after dead vegetation is noticed in the area of the pipe or a pressure test of the pipe is conducted. After the leak is detected, the fluid transfer pipes are then exposed and repaired or replaced. This procedure, however, necessitates that the fluid transfer pipe system be taken out of service for an extended period of time until the leak is localized and repaired.

SUMMARY OF THE INVENTION

Accordingly, it is an object of the present invention to provide a leak detection apparatus and method for use in conjunction with underground fluid systems.

It is a further object of the present invention to provide a leak detection apparatus and method for detecting leaks in underground fluid transfer pipes.

It is a still further object of the present invention to provide a leak detection apparatus and method for use in conjunction with underground fluid transfer pipes where a leak is suspected.

Yet another object of the present invention is to provide a leak detection apparatus and method for use in conjuction with buried fluid pipes which can be implemented in new or existing installations without requiring pipe removal or disrupting pipe service.

It is another object of the present invention to provide an apparatus and method for probing upgradient after a leak is detected to localize the source of the leak.

According to the present invention, detection of the tracer in the surrounding soil area is achieved by selecting a highly volatile tracer, which is introduced into the fluid in a liquid phase and escapes from any leaking fluid in a gas phase. The selection of tracer is important to insure that no interference from ambient chemicals in the surrounding soil is encountered when detecting the tracer. A permeable tube is buried in the soil in a position above an underground fluid transfer pipe. At least one end of the permeable tube is terminated in a recess vault for access to the end of the permeable tube and sampling soil gases from the permeable tube. Evacuation of the permeable tube provides a soil gas sample which may then be analyzed by a gas chromatograph or other suitable analytical instrument. Should a fluid leak occur in the underground fluid transfer pipe, the tracer would also escape in its liquid form and, upon encountering air in the subsurface soil, vaporize into a gas phase and disperse by diffusion through the soil surrounding the underground fluid transfer pipe. Evacuation of the permeable tube, then, would draw the gaseous tracer into and through the permeable tube for collection and analysis.

The fluid in the underground pipe may include a liquid or gas fuel, such as gasoline, natural gas, methane, butane, propane, synthetic gas or the like. A quantity of the tracer is mixed with the fluid at the storage source of the fluid and transported along the underground pipes with the fluid contained therein.

The tracer technology employed in the underground pipe leak detection system of the present invention relates to U.S. Pat. Nos. 4,725,551 and 4,709,557 issued to Glenn Thompson, the disclosures and teachings of which are expressly incorporated herein. The tracer is normally a highly volatile organic tracer having a boiling point in the range of about $-72°$ C. to about $150°$ C., with the preferred compounds being of the group known as fluorinated halocarbons, commonly referred to as halocarbons or fluorocarbons. The underground pipe leak detection system of the present invention provides a highly sensitive system for detecting and locating leaks in underground pipes. When coupled with the difficulty of monitoring and detecting such leaks under current technology, the present invention represents a significant advancement in the state of the art.

The method of the present invention also contemplates a method for locating leaks in at least one or more subsurface fluid pipes. The method includes burying at least one permeable tube above and along the length of the at least one or more subsurface fluid pipes; providing means for accessing and sampling at least one end of the permeable tube for accessing and sampling soil gasses diffused into the permeable tube from the subsurface area; mixing a volatile liquid tracer in the liquid phase with fluid in a storage source connected to the at least one or more subsurface fluid pipes; flowing the tracer-doped fluid through the subsurface fluid pipes; evacuating soil gas diffused into the permeable tube; collecting the soil gas sample evacuated from the permeable tube and analyzing the soil gas sample for presence of the tracer in the gas phase. This method may also include probing the tracer plume if a leak is detected or mixing a different and distinct tracer with fluid in each of a plurality of different storage sources for the subsurface pipes so that the analyzing can detect the presence of a leak and pinpoint the particular pipe or pipes which are leaking.

These and other features and advantages of the present invention will be more fully understood from the following more detailed description of the preferred embodiment of the present invention with reference to the accompanying Figures, in which like features are identified by like reference numerals.

BRIEF DESCRIPTION OF THE DRAWINGS

FIG. 5 is a plan view of a representative underground pipe leak detection system installation in accordance with the present invention.

DETAILED DESCRIPTION OF THE PREFERRED EMBODIMENT

Figure 1:
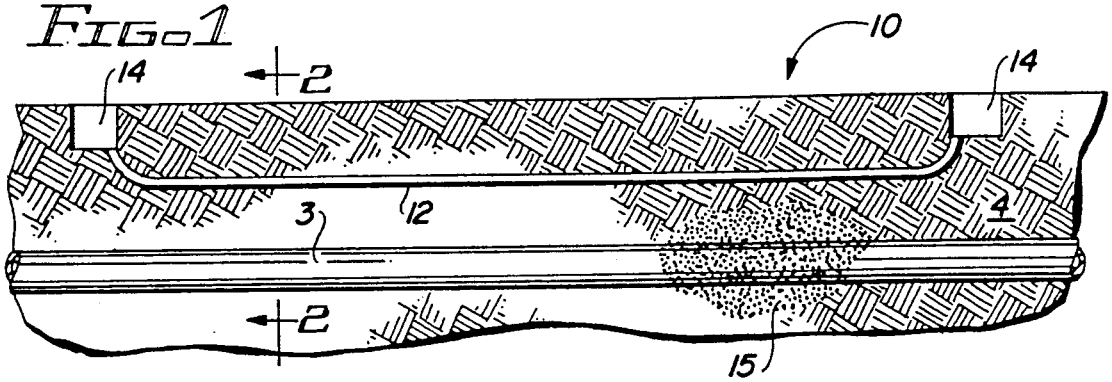
FIG. 1 is a side elevational view of an idealized section of the underground pipe leak detection system according to the present invention.
Figure 2:
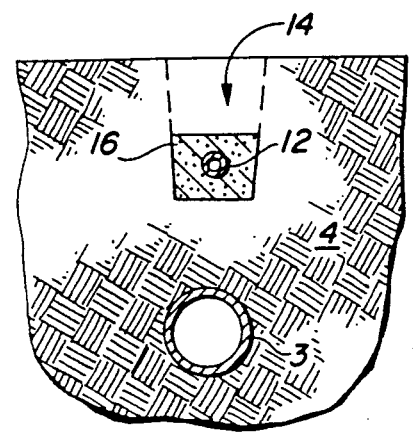
FIG. 2 is a cross-sectional view taken along line 2—2 of FIG. 1.
Figure 4:
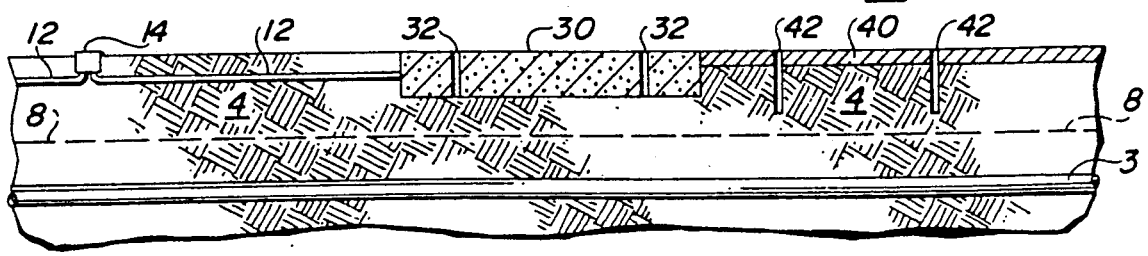
FIG. 4 is a side elevational view cross-sectional view of the underground pipe leak detection system of the present invention in combination with alternative monitoring methods used where burying a permeable tube is impractical.

Referring to FIGS. 1 and 2 of the accompanying drawings, there is shown the underground pipe leak detection system 10 of the present invention. A pre-existing or newly laid underground pipe 3 in the backfill 4 carries a fluid, which may be a liquid such as gasoline or the like or a gas, such as natural gas, synthetic gas, methane, butane, propane or the like. Typically the backfill 4 is sand, gravel, natural soil or the like depending upon the region in which the underground pipe is located. Those skilled in the art will recognize, however, that the underground pipe 3 may also be lying under the subsurface water table 8 as depicted in FIG. 4. Regardless of the specific material for the backfill 4, the backfill 4 is conductive to air flow or molecular diffusion through the backfill 4.

A gas permeable tube 12 is disposed in the backfill 4 generally above and in-line with the lengthwise aspect of the underground pipe 3. In this manner, the permeable tube 12 follows the course of the underground pipe 3. At least one end of the permeable tube 12 terminates in a recess vault 14 which permits access to a terminal end of the permeable tube 12. Where a pre-existing underground pipe 3 is encountered, a shallow ditch may be dug immediately above and lengthwise to the underground pipe 3 and the permeable tube 12 laid in the shallow ditch. To further ensure air conductivity and water drainage, it is preferable to provide a gravel fill 16 surrounding the permeable tube 12 at the bottom of the shallow ditch. The shallow ditch is then backfilled with the native backfill material 4 covering the gravel fill 16 and the permeable tube 12.

It has been found desirable, though not necessary, to employ as the permeable tube 12, a scintered rubber hose having an air permeability of about 6.9 liters ±0.7 liters/minute/meter at 10.7 cm Hg pressure differential at 27° C. and having an outside diameter of ¾" and an inside diameter of ½". In accordance with the preferred embodiment of the present invention, it has been found that soil irrigation tubing exhibits particular utility for the purposes of the present invention. The selection of the material for the permeable tube 12 must consider the degree of air permeability to insure compatibility with the tracer selected and employed.

As more fully described in U.S. Pat. Nos. 4,725,551 and 4,709,557, the fluid which is transferred by the underground pipe 3 is doped with a tracer as the fluid source, such as an underground fluid storage tank. The tracer as preferably a highly detectable volatile organic tracer such as a fluorinated halocarbon compound, having a boiling point typically, but not necessarily, lower than the boiling point of the fluid carried in the underground pipe and preferrably within the range of about $-72°$ to about 150° C. A tracer concentration in the gasoline of approximately ten parts per million, or 0.001 percent, is desired to insure detection of very small leaks. Should a leak 15 develop in the underground pipe 3, the leaking fluid would contain the tracer in the liquid phase. Immediately upon encountering air present in the backfill 4, the tracer volatilizes to the gas phase and diffuses through the interstitial spaces in the backfill 4. As it rises toward the surface the gas phase tracer encounters the permeable tube 12 and diffuses into the interior space of the permeable tube 12.

Soil gas samples are withdrawn by accessing the terminal end of the permeable tube 12 through the recess vault 14, and evacuating the soil gasses from the interior of the permeable tube 12. The soil gas samples may be collected in suitable non-reactive containers, such as metal ampules, and taken off-site for analysis with appropriate analytical instruments, such as a gas chromatograph, to detect the presence of tracer in the soil gas sample.

Once the presence of tracer in the soil gas sample is determined, the approximate location of the leak is localized to a particular length of permeable tube 12. The leak may be further localized to a particular portion of the permeable tube by probing a tracer plume which is established in the backfill 4. The tracer plume originates at the exact location of the leak and will be well-established in the backfill 4 by the time the tracer is detected in the soil gas sample. The tracer plume may be used to locate the exact location of the leak by probing the plume upgradient to the leak. Probing the tracer plume involves drilling small holes into the backfill and collecting soil gas samples through the drilled holes thereby enabling detection of the tracer plume and localization of the leak to within a few feet or less.

Figure 3:
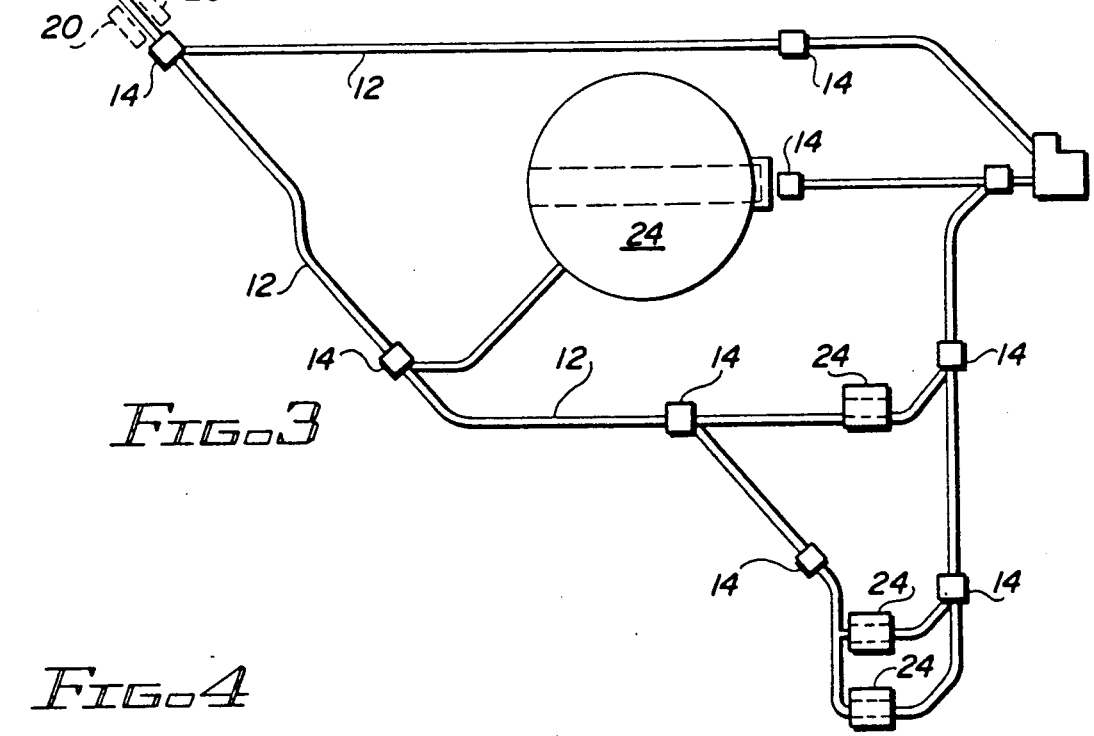
FIG. 3 is a diagrammatic view showing a layout of the underground pipe leak detection system of the present invention.

As more clearly illustrated in FIGS. 3–5, the underground pipe leak detection system 10 of the present invention may be employed in a wide variety of configurations. FIG. 3 is a diagrammatic view showing the plan layout of the underground pipe leak detection system of the present invention at an Air National Guard fire training area. A plurality of lengths of permeable tubing 12 are overlying underground pipes (not shown). Each of the plurality of lengths of permeable tubing 12 have at least one end of which terminates in a recess vault 14. Recess vault 14 permits sampling of soil gas from the intermediate length of permeable tubing 12. The underground pipes are fuel transfer lines for carrying fuel to each of a plurality of burn pits 24. A plurality of underground tanks 20 serve as supply tanks for the fuel carried in the underground pipes to the burn pits 24. The burn pits 24, which are used for fire training exercises, are each underlain by perforated pipes manifolded together. The manifold is accessed, for soil gas sampling, at a recess vault 14 closest to the burn pit 24.

The underground tanks 20 are provided with the rapid leak detection system substantially as described in U.S. Pat. Nos. 4,725,551 and 4,709,557. It has been found, under certain backfill conditions, that the subsurface vapor pipe of U.S. Pat. No. 4,725,551 may not be needed if the air conductivity of the backfill is sufficient to evacuate a soil gas sample through the sample pipe. Thus, underground tanks 20 were provided with a set of four probes manifolded by air conduit 23 to the continuous air evacuation pump 22. Two of the probes penetrated to a depth of two feet, and the other two penetrated to a depth of seven feet. Each probe is accessible independently, if required, through a pipe plug at the ground surface. During routine monitoring, the probes were sampled collectively at the air pump 22 outlet. Any leakage occurring directly from the underground tanks 20 is detected by sampling the air drawn by air pump 22 through air conduit 23 from the probes disposed in the backfill material surrounding the underground tanks 20 to the pump 22.

A simulated leak was created by spiking gasoline with the tracer chemical dibromotetrafluoroethane and pouring the spiked gasoline down a steel probe disposed in the backfill in close proximity to an underground pipe, The spiked gasoline was injected at a rate of one gallon per day. Two runs were made, the first with a tracer concentration of 1 part per million and the second with a tracer concentration of 10 parts per million. The simulated leak was positioned 93 feet from a first recess vault at one end of a section of permeable tubing 12 and 369 feet from a second recess vault at a second end of the section of permeable tubing 12. A second permeable tube 12 was sampled as a control to monitor background tracer concentrations. Analysis of the soil gas samples was performed in the lab by gas chromatography.

The first run, using 1 ppm of tracer, detected a small peak in the soil gas sample taken from the first recess vault 93 feet from the simulated leak, while only a small deflection of the baseline was noted from the sample taken from the second recess vault 369 feet from the simulated leak. Both the small peak and the deflection were detected four days after initial release of the tracer spiked gasoline. No tracer was detected in the control hose.

In the second run, tracer was detected at both the first and second recess vaults after one day of the initial release of the one gallon of 10 ppm tracer doped fuel. Again no tracer was detected in the control hose.

It is evident from these results that the underground pipe leak detection system of the present invention is capable of detecting a leak of at least one gallon per day where the tracer concentration is at least 10 parts per million whithin one day of injecting tracer into the pipeline system, and that the system has sufficient sensitivity to detect leaks on the order of 0.02 gallons per day.

Illustrated in part in FIGS. 4 and 5 is the layout of the underground pipe leak detection system of the present invention at an airport. FIG. 4 depicts an idealized installation of the underground pipe leak detection system of the present invention where in addition to native soil, concrete and/or asphalt surfaces cover the underground pipe. Where the underground pipe is overlain with a soil cover 4, the permeable tube 12 may be installed as previously described and soil gas samples withdrawn through a recess vault 14 disposed at least at one end of the permeable tube 12. Where, however, the underground pipe is covered with a concrete 30 or asphalt 40 surface it is impractical and unnecessary to excise portions of the concrete 30 or asphalt 40 surface to lay the permeable tube 12. The permeable tube 12 and recess vault 14 may be buried under the concrete 30 or asphalt 40 surface if the piping is being rebuilt or if new piping is being installed. When the permeable tube 12 is being installed with new piping which is situated entirely above the groundwater table 8, it is most advantageous to install the permeable hose 12 in the pipe ditch along with, and adjacent to, the new piping rather than aboe the pipe as shown in FIG. 1. However, in accordance with the preferred embodiment of the present invention, where a concrete surface 30, such as a taxiway or roadway is encountered, at least one of a plurality of bore holes 32 are drilled entirely through the concrete surface 30 and finished with pipe plug inserts flush with the concrete surface 30. Where an asphalt surface 40 is encountered, at least one of a plurality of asphalt bore holes are drilled through the asphalt surface 40, and a probe 42 is inserted into each of the asphalt bore holes and inserted into the underlying soil 4. Each of the probes 42 are then finished with a pipe plug insert flush with the asphalt surface 40.

Each of the bore holes 32 in the concrete surface 30 and the asphalt bore holes and probes 42 inserted therein are disposed above the path of the underground pipe 3. Soil gas samples are withdrawn from the subsurface soil 4 by evacuating volumes of air from the subsurface soil 4 and collecting samples of the evacuated air. In this manner any leaking tracer-doped fluid will cause the tracer to vaporize and diffuse through the soil 4 and be detected by evacuation and testing of soil gas samples either through the bore holes 32 or the probes 42.

As shown in FIG. 5, a plurality of permeable tubes 12 and associated recess vaults 14 are depicted by solid squares labeled H-x, wherein x is an integer designating the serial location of the permeable tube 12 relative to the path of the underground pipe. A plurality of bore holes 32 or probes 42 are depicted by solid circles labeled P-x, wherein x is an integer designating the serial location of the bore hole 32 or probe 42 relative to the path of the underground pipe. It will be recognized that certain installations will require differing numbers of bore holes 32, probes 42 or lengths of permeable tube 12 depending upon the size of the installation.

The underground pipe leak detection system of the present invention may be operably combined with the underground tank testing systems and methods disclosed in U.S. Pat. Nos. 4,725,551 and 4,709,557, such that the underground tank testing systems and methods may be employed with or without the need for a vapor probe, depending upon the porosity and air conductivity of the backfill 4.

Furthermore, in any particular installation there may be a plurality of underground tanks and associated underground pipes containing either the same or different fluids. In such a case, different and distinct tracers may be used in each tank and associated underground piping, so that it may be quickly determined exactly which tank or underground pipe is leaking.

The above-described system offers far greater sensitivity to slow or low-level leaks than do any of the existing standard test systems or methods. Leaks of a few milliliters per day would be difficult if not impossible to detect by conventional methods unless the tank or the pipe was placed out of service for a protracted time period. The system and method of the present invention detects such leaks quickly. The ability to localize the source of the leak by monitoring each length of permeable tube and tracking the tracer plume on-site aids rapid identification of the location of the leak and minimizes down time for the pipeline system.

While the invention has been particularly described and illustrated with reference to the preferred embodiments thereof, it is not intended that the invention be strictly limited to these embodiments. Those having ordinary skill in the art will recognize that variations and modifications differing from these embodiments, but falling within the spirit and scope of the invention, are possible. Other materials or configurations, for example, are contemplated by the present invention. All such variations and modifications as fall within the appended claims are therefore considered within the scope of the invention.

What is claimed is:

1. An apparatus for detecting a leak from at least one of a plurality of subsurface fluid pipes containing fluids therein and surrounded by a backfill material, comprising:
- volatile liquid phase tracer means for providing a gas phase detectable component in a fluid leak, a quantity of said volatile liquid phase tracer means being mixed with the fluid in said at least one of a plurality of subsurface fluid pipes;
- at least one of a plurality of gas permeable tubular members disposed in the backfill material above at least a portion of the at least one of a plurality of subsurface fluid pipes, wherein said at least one of a plurality of gas permeable tubular members further comprises a scintered rubber hose having an air permeability of about 6.9 liters ±0.7 liters per minute per meter at 10.7 cm Hg pressure differential at 27° C.; and
- access means disposed in the backfill material for accessing at least one end of said at least one of a plurality of gas permeable tubular members.

2. The apparatus of claim 1, wherein the fluid in said at least one of a plurality of subsurface fluid pipes is a liquid.

3. The apparatus of claim 1, wherein said fluid in said at least one of a plurality of subsurface fluid pipes is a gas.

4. The apparatus of claim 1, wherein said fluid in said at least one of a plurality of subsurface fluid pipes is fuel.

5. The apparatus of claim 1, wherein said access means further comprises a recess vault disposed in the backfill.

6. The apparatus of claim 1, wherein said apparatus further comprises means for evacuating air contained within said at least one of a plurality of gas permeable tubular members thereby drawing a quantity of said volatile liquid phase tracer means in the gas phase through said at least one of a plurality of gas permeable tubular members, said means being operably coupled to said at least one end of said at least one of a plurality of gas permeable tubular members accessed from said access means.

7. The apparatus of claim 6, wherein said apparatus further comprises means for collecting at least one sample of said air drawn through said at least one of a plurality of gas permeable tubular members.

8. The apparatus of claim 7, wherein said apparatus further comprises means for analyzing said at least one sample of said air drawn through said at least one of a plurality of gas permeable tubular members.

9. The apparatus of claim 8, wherein said means for analyzing said at least one sample of said air further comprises a gas chromatograph.

10. The apparatus of claim 1, wherein said liquid phase tracer means is selected from the group consisting of fluorinated halocarbons, methanes, and ethanes.

11. The apparatus of claim 1, wherein said liquid phase tracer means if a fluorinated halocarbon compound having a boiling point less than about 150° C.

12. The apparatus of claim 9, wherein said liquid phase tracer means is selected from the group consisting of halogenated methanes, halogenated ethanes, sulfur hexafluoride, perfluorodecalin, and perfluoro 1,3 dimethlycyclohexane.

13. The apparatus of claim 9, wherein said liquid phase tracer means is a halogenated methane selected from the group consisting of chlorobromodifluoromethane, trichlorofluoromethane, trifluoroiodomethane, trifluorobromomethane, dibromodifluoromethane, dichlorodifluoromethane and tetrafluoromethane.

14. The apparatus of claim 9, wherein said tracer is a halogenated ethane selected from the group consisting of dichlorotetrafluoroethane, hexafluoroethane, trichlorotrifluoroethane, dibromotetrafluoroethane and tetrachlorodifluoroethane.

15. The apparatus of claim 10, wherein said boiling point of said liquid phase tracer means is between about −72° C. and 150° C.

16. The apparatus of claim 1, wherein said apparatus further comprises, in combination, a plurality of bores passing through any obstruction disposed over the backfill material, wherein said plurality of bores are substantially in-line and above each of the at least one of a plurality of underground pipes.

17. The apparatus of claim 16, wherein said plurality of bores further comprises at least one of a plurality of subsurface sample pipes positioned within at least one of said plurality of bores and extending within the backfill material, said at least one sample pipe positioned such that subsurface soil gases may be drawn into said at least one of a plurality of subsurface sample pipes.

18. An apparatus for detecting a leak from at least one of a plurality of subsurface fluid storage tanks and from at least one of a plurality of subsurface fluid pipes in fluid flow communication therewith, containing fluids therein and surrounded by a backfill material, comprising:
- volatile liquid phase tracer means for providing a gas phase detectable component in a fluid leak, a quantity of said volatile liquid phase tracer means being mixed with the fluid in said at least one of a plurality of subsurface storage tanks or said at least one of a plurality of subsurface fluid pipes;
- at least one subsurface sample pipe positioned within said backfill material and a surface outlet, said at least one sample pipe positioned in relatively close proximity to said at least one of a plurality of subsurface tanks;
- at least one tubular member disposed in the backfill material above at least a substantial lengthwise portion of the at least one of a plurality of subsurface fluid pipes, wherein said at least one tubular member further comprises a scintered rubber hose having an air permeability of about 6.9 liters ±0.7 liters per minute per meter at 10.7 centimeters Hg pressure differential at 27° C.;
- means for evacuating air from the subsurface backfill material, around said at least one of a plurality of subsurface fluid storage tanks, past said at least one subsurface tank and in relatively close proximity thereto thereby volatilizing leaking volatile liquid phase tracer means to a gas phase tracer means, and drawing said gas phase tracer means into said at least one subsurface sample pipe and out of said sample pipe surface outlet;
- access means disposed in the backfill material for accessing at least one end of said at least one of a plurality of tubular members; and
- means for analyzing said air evacuated from said at least one subsurface sample pipe for detecting the presence of said gas phase tracer means as an indication of a leak from the at least one subsurface tank.

19. A method for locating leaks from at least one of a plurality of subsurface pipes containing a fluid therein and buried in a backfill material, comprising the steps of:

disposing at least one of a plurality of tubular members in said backfill, in close proximity and superior to a substantial lengthwise portion of said at least one of a plurality of subsurface pipes, each of said tubular members further comprising a scintered rubber hose having an air permeability of about 6.9 liters ±0.7 liters per minute per meter at 10.7 cm Hg pressure differential at 27° C.;

disposing access means, in said backfill material, for accessing at least one end of said at least one of a plurality of tubular members disposed in said backfill material;

mixing, with said fluid in said at least one of a plurality of subsurface fluid storage tanks, volatile liquid phase tracer means for providing a gas phase detectable component in a fluid leak from said at least one of a plurality of subsurface pipes;

accessing said at least one end of said at least one of a plurality of tubular members;

evacuating air through said at least one of a plurality of tubular members; and analyzing the evacuated air for the presence of said gas phase tracer component for determining the presence of a leak in at least one of said plurality of subsurface pipes.

20. The method of claim 19, wherein the fluid in said at least one of a plurality of subsurface fluid pipes is a liquid.

21. The method of claim 19, wherein said fluid in said at least one of a plurality of subsurface fluid pipes is a gas.

22. The method of claim 19, wherein said fluid in said at least one of a plurality of subsurface fluid pipes is fuel.

23. The method of claim 19, wherein said access means further comprises a recess vault disposed in the backfill.

24. The method of claim 19, wherein said step of analyzing further comprises analying said at least one sample of said air by gas chromatography.

25. The method of claim 19, wherein said liquid phase tracer means is selected from the group consisting of fluorinated halocarbons, methanes, and ethanes.

26. The method of claim 19, wherein said liquid phase tracer means is a fluorinated halocarbon compound having a boiling point less than 150° C.

27. The method of claim 25, wherein said liquid phase tracer means is selected from the group consisting of halogenated methanes, halogenated ethanes, sulfurhexafluoride, perfluorodecalin, and perfluoro 1,3 dimethlycyclohexane.

28. The method of claim 25, wherein said liquid phase tracer means is a halogenated methane selected from the group consisting of chlorobromodifluoromethane, trifluoroiodomethane, trichlorofluoromethane, trifluorobromomethane, dibromodifluoromethane, dichlorodifluoromethane and tetrafluoromethane.

29. The method of claim 25, wherein said tracer is a halogenated ethane selected from the group consisting of dichlorotetrafluoroethane, hexafluoroethane, trichlorotrifluoroethane, dibromotetrafluoroethane and tetrachlorodifluoroethane.

30. The method of claim 26, wherein said boiling point of said liquid phase tracer means is between about −72° C. and 150° C.

31. The method of claim 19, wherein said method further comprises providing a plurality of bores passing through any obstruction disposed over the backfill material, wherein said plurality of bores are substantially in-line and above each of the at least one of a plurality of underground pipes.

32. The method of claim 31, wherein said method further comprises the step of disposing, in at least one of said plurality of bores, at least one of a plurality of subsurface sample pipes positioned within at least one of said plurality of bores and extending within the backfill material, said at least one sample pipe positioned such that subsurface soil gases may be drawn in relatively close proximity past said at least one of a plurality of subsurface sample pipes and into said at least one of a plurality of subsurface sample pipes.

33. A method for locating leaks from at least one of a plurality of subsurface fluid storage tanks and subsurface pipes in fluid flow communication therewith and containing fluids therein, and surrounded by a backfill material, comprising the steps of:

overlaying the at least one of a plurality of subsurface pipes with at least one of a plurality of gas permeable tubular members disposed in the backfill material and in close proximity to said at least one of a plurality of subsurface pipes;

disposing access means, in the backfill material, for accessing at least one end of said at least one of a plurality of gas permeable tubular members disposed in the backfill material;

mixing, with the fluid in the at least one of a plurality of subsurface fluid storage tanks, volatile liquid phase tracer means for providing a gas phase detectable component in a fluid leak from said at least one of a plurality of subsurface storage tanks or said at least one of a plurality of subsurface pipes;

providing at least one subsurface sample pipe positioned within said backfill material and having a surface outlet, said at least one sample pipe being positioned in relatively close proximity to said at least one of a plurality of subsurface fluid storage tanks;

evacuating air through the subsurface backfill material, thereby drawing said gas phase detectable component present in the backfill into said at least one subsurface sample pipe and out of said sample pipe surface outlet;

accessing said at least one end of said at least one of a plurality of gas permeable tubular members;

evacuating air through said at least one of a plurality of gas permeable tubular members; and analyzing said evacuated air in said at least one of a plurality of gas permeable tubular members and said evacuated air from said at least one subsurface sample pipe, for detecting the presence of said gas phase tracer component as an indication of a leak from the at least one subsurface fluid storage tank or said at least one of a plurality of subsurface fluid pipes.

* * * * *